Aug. 14, 1951 R. A. GRIMSHAW ET AL 2,564,598
MINNOW BUCKET
Filed Dec. 11, 1946
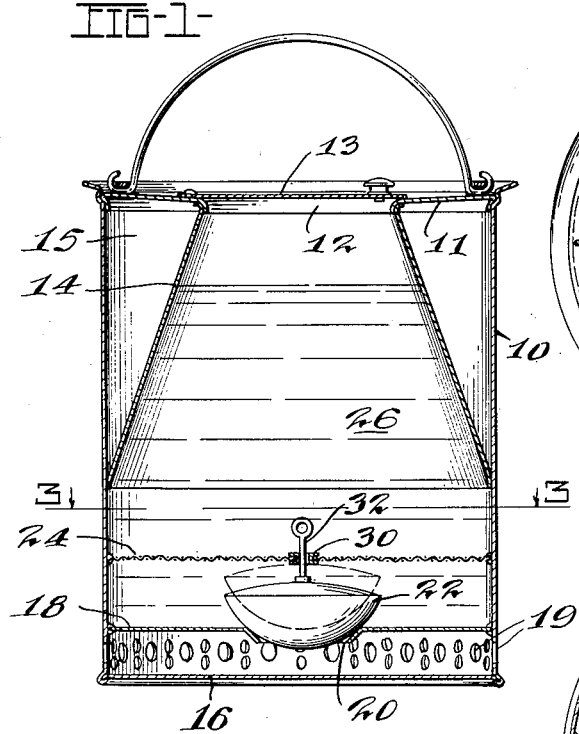
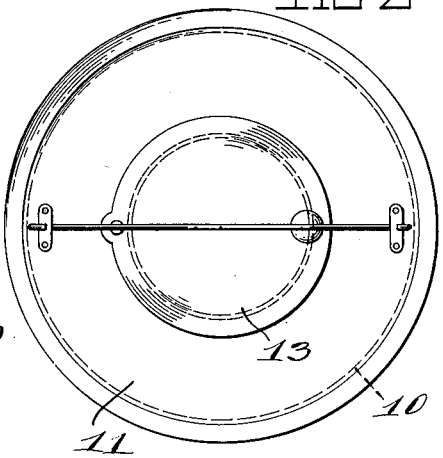
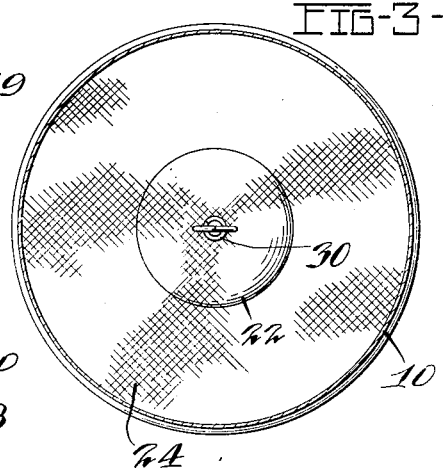
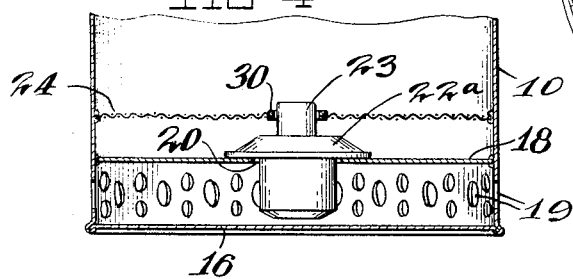
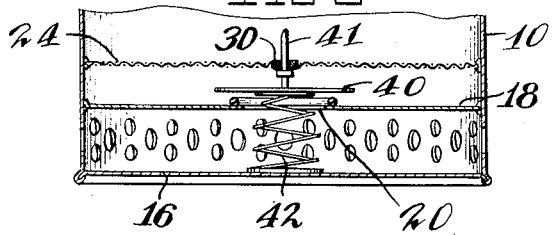
INVENTORS
ROBERT A. GRIMSHAW
RALPH GRIMSHAW JR.
BY
Owen & Owen
ATTYS.

Patented Aug. 14, 1951

2,564,598

UNITED STATES PATENT OFFICE 2,564,598

MINNOW BUCKET

Robert A. Grimshaw, Toledo, and Ralph Grimshaw, Jr., Fremont, Ohio

Application December 11, 1946, Serial No. 715,480

4 Claims. (Cl. 43—56)

This invention relates to minnow buckets or containers for live bait and has for its primary object to provide a device in which fresh water is circulated whenever the container is partially immersed in a stream and in which water is trapped as soon as the container is lifted out of the water.

Another object of the invention is to provide a live bait container which is compartmented so that it may be set into a stream or lake without sinking and which will, at the same time, provide for the circulation of fresh water to the bait.

Other objects and advantages of the invention will become apparent from the following specification, reference being had to the accompanying drawings in which:

Fig. 1 is a central vertical sectional view of a minnow bucket embodying the present invention; Fig. 2 is a top plan view thereof; Fig. 3 is a section on line 3—3 of Fig. 1; and Figs. 4 and 5 are fragmentary central vertical sectional views showing modified forms of automatically operating valves usable in the present invention.

Referring to the drawings, and particularly to Fig. 1, the invention comprises a container body 10 having a cover 11 in which a central opening 12 is provided for access to the interior. The usual displaceable lid 13 is adapted to close the opening 12. An inner wall 14 is provided which forms a closed compartment 15 with the exterior wall and cover 11. The container is thus made to have sufficient buoyancy to float when placed in a body of water.

The bottom of the container is formed by a wall 16 which is preferably solid. A second solid wall 18 is provided spaced from the bottom, and the side walls of the container are perforated as at 19 between wall 18 and the bottom to permit a free flow of water into the intervening space. Wall 18 has a valved opening 20 disposed preferably in its center, and a float valve 22 is provided to control the opening.

A third wall 24 which may conveniently be made of screening or other mesh material spans the interior of the container and forms a chamber 26 in which bait is kept. Wall 24 may be made removable or it may be fixed in place. The member is further provided with a central grommet or valve guide 30 which cooperates with a stem 32 projecting upwardly from the float valve 22.

In the operation of the device shown in Fig. 1, bait is placed in the chamber 26 and the container filled with water. The weight of the water will keep the float valve 22 closed against its seat in the solid wall 18 so that the water cannot escape. When the container is placed in a body of water, as a stream or lake during the time that the user is fishing, water enters the space below wall 18 causing the float valve 22 to move up from its seat. Fresh water can thus circulate through the bait chamber, thus prolonging the life of the bait. When the container is lifted from the water, the space below wall 18 is again drained and the float valve 22 resumes its seated position, trapping water in the bait chamber.

The float valve 22 is preferably a rubber bulb type, and may take the form of a float carried flap valve as shown in Fig. 4. As there shown, the valve 22a cooperates with a flat seat and has an upwardly projecting stem portion 23 acting as a guide by cooperation with an opening in the mesh partition or wall 24.

As shown in Fig. 5, the valve may also take the form of a spring pressed check. Thus, a plate 40 guided in its movements by a stem 41 may be used to close opening 20. The plate is biased to open position by a spring 42 and will stand in such position whenever the container is immersed so that the water pressure above the valve plate is overcome by water pressure and spring force on the lower face. When the container is lifted from the water, the pressure on the upper face of the valve is sufficient to force it closed against spring 42.

While it is preferred to utilize a container compartmented for buoyancy so that the device will float with its top slightly above the surface of a stream or lake, it should be understood that satisfactory operation of the water circulating parts will be had whether the container floats or not. Similarly, other modifications and changes may be made in the form and disposition of the parts without departing from the invention as defined in the appended claims.

What we claim is:

1. In a minnow bucket or the like, a body having an opening in its top for the introduction of bait and having a solid bottom, a foraminous partition across said body, a solid partition across said body underlying said last partition and having an opening therein, said body having openings through which water flows under said solid partition when the bucket is immersed, and a valve operating to admit water through the opening in said solid partition when the bucket is immersed and to seal the opening against the escape of water from above said solid partition when the bucket is not immersed.

2. A bucket in accordance with claim 1 in which said valve comprises a float.

3. In a minnow bucket or the like, a body having an opening in its top for the introduction of bait and having a solid bottom, a foraminous partition across said body, a solid partition across said body underlying said last partition and having an opening therein, said body having side wall openings between said bottom and said solid partition, and a valve operating to admit water through the opening in said solid partition when the bucket is immersed and to seal the opening against the escape of water from above said solid partition when the bucket is not immersed.

4. A bucket in accordance with claim 1 in which said valve comprises a float and which includes airtight compartments for maintaining the bucket in a floating position.

ROBERT A. GRIMSHAW.
RALPH GRIMSHAW, JR.

REFERENCES CITED

The following references are of record in the file of this patent:

UNITED STATES PATENTS

| Number | Name | Date |
|---|---|---|
| 760,570 | Schellhammer | May 24, 1904 |
| 1,471,015 | Tompkins | Oct. 16, 1923 |
| 2,159,718 | Spiner et al. | May 23, 1939 |